US012604888B2

(12) United States Patent
Lee et al.

(10) Patent No.: US 12,604,888 B2
(45) Date of Patent: Apr. 21, 2026

(54) FOLDABLE TREE PLATFORM

(71) Applicant: AVID STRATEGIC LLC,
Frankenmuth, MI (US)

(72) Inventors: Scott Lee, Frankenmuth, MI (US);
Matthew R. Voorhees, Rome, NY (US)

(73) Assignee: Avid Strategic LLC, Frankenmuth, MI
(US)

( * ) Notice: Subject to any disclaimer, the term of this
patent is extended or adjusted under 35
U.S.C. 154(b) by 435 days.

(21) Appl. No.: 18/226,628

(22) Filed: Jul. 26, 2023

(65) Prior Publication Data

US 2025/0031687 A1 Jan. 30, 2025

(51) Int. Cl.
*A01M 31/02* (2006.01)

(52) U.S. Cl.
CPC .................................. *A01M 31/02* (2013.01)

(58) Field of Classification Search
CPC .................................................... A01M 31/02
USPC .......................................................... 182/187
See application file for complete search history.

(56) References Cited

U.S. PATENT DOCUMENTS

| | | | | |
|---|---|---|---|---|
| 857,203 | A * | 6/1907 | Randall | A01M 31/02 |
| | | | | 248/217.1 |
| 2,512,174 | A * | 6/1950 | Roeder | A01M 31/02 |
| | | | | 182/187 |
| 2,635,676 | A * | 4/1953 | Graffius | A01M 31/02 |
| | | | | 297/54 |
| 3,065,821 | A * | 11/1962 | Hundley, Jr. | A01M 31/02 |
| | | | | 182/187 |
| 3,392,802 | A * | 7/1968 | Moore | A01M 31/02 |
| | | | | 182/187 |
| 3,949,835 | A * | 4/1976 | Butler | A01M 31/02 |
| | | | | 248/230.8 |
| 4,549,633 | A * | 10/1985 | Merritt | A01M 31/02 |
| | | | | 182/135 |
| 4,549,635 | A * | 10/1985 | Early | A01M 31/02 |
| | | | | 182/187 |
| 4,601,364 | A * | 7/1986 | York | A01M 31/02 |
| | | | | 182/187 |
| 4,603,757 | A * | 8/1986 | Hollinger | A01M 31/02 |
| | | | | 182/187 |
| 4,987,972 | A * | 1/1991 | Helms | A01M 31/02 |
| | | | | 182/187 |
| 5,060,756 | A * | 10/1991 | D'Acquisto | A01M 31/025 |
| | | | | 182/187 |
| 5,409,083 | A * | 4/1995 | Thompson | A45F 3/26 |
| | | | | 182/187 |
| 5,562,180 | A * | 10/1996 | Herzog | A01M 31/02 |
| | | | | 182/187 |

(Continued)

*Primary Examiner* — Noah Chandler Hawk
(74) *Attorney, Agent, or Firm* — Robert L. Stearns;
Dickinson Wright PLLC

(57) ABSTRACT

A foldable tree platform assembly includes a longitudinal
post for placement along the trunk of the tree. A foot-
engaging platform is supported by the post and moveable
between a forwardly projecting use position in which the
platform extends transversely of the post and defines an
upper surface of the platform for supporting the foot or feet
of a user and a stowed position in which the platform
extends along the post. A standoff is supported by the post
and is moveable relative to the post between a rearwardly
projecting use position for engaging the trunk of the tree to
support the post offset from the tree and a stowed position
in which the standoff is folded at least partly into the plane
of the post.

20 Claims, 14 Drawing Sheets

(56) References Cited

U.S. PATENT DOCUMENTS

| | | | | | |
|---|---|---|---|---|---|
| 8,240,432 | B2 * | 8/2012 | Call | A01M 31/02 | 182/135 |
| 9,027,709 | B2 * | 5/2015 | Wheelington | A01M 31/02 | 182/129 |
| 9,204,628 | B2 * | 12/2015 | Priest | A01M 31/02 | |
| 11,317,622 | B2 * | 5/2022 | Power, II | A01M 31/02 | |
| 11,808,085 | B2 * | 11/2023 | Power, II | A63B 27/00 | |
| 12,427,378 | B2 * | 9/2025 | Lee | A63B 27/00 | |
| 2006/0054397 | A1 * | 3/2006 | Pringnitz | A01M 31/02 | 182/187 |
| 2007/0012734 | A1 * | 1/2007 | Lee | A45F 3/08 | 224/155 |
| 2007/0012735 | A1 * | 1/2007 | Lee | A45F 3/04 | 224/155 |
| 2011/0000743 | A1 * | 1/2011 | Call | A01M 31/02 | 182/115 |
| 2011/0180351 | A1 * | 7/2011 | Cama | A01M 31/02 | 182/222 |
| 2012/0080267 | A1 * | 4/2012 | Furseth | E06C 7/48 | 182/115 |
| 2019/0053483 | A1 * | 2/2019 | Infalt | E06C 1/34 | |
| 2019/0055782 | A1 * | 2/2019 | Infalt | A01M 31/02 | |
| 2021/0204538 | A1 * | 7/2021 | Power, II | A01M 31/02 | |
| 2024/0057585 | A1 * | 2/2024 | Leach | A01M 31/02 | |
| 2024/0188558 | A1 * | 6/2024 | Garcia | A01M 31/02 | |
| 2024/0196881 | A1 * | 6/2024 | Ferguson | A01M 31/02 | |

* cited by examiner

FOLDABLE TREE PLATFORM

BACKGROUND

1. Technical Field

This application relates generally to portable tree platforms for use by hunters, including tree saddle hunters, to provide a foothold when hunting from a tree. The application relates particularly to such platforms that are designed to be folded flat when not in use for compact transport and storage.

This application relates generally to portable tree platforms for use by hunters, including tree saddle hunters, to provide a foothold when hunting from a tree. The application relates particularly to such platforms that are designed to be folded flat when not in use for compact transport and storage.

2. Related Art

Many bow hunters hunt from trees and those that are serious often hunt using a tree saddle and platform combination. The saddle is strapped to the user and coupled to a tether line enabling the hunter to suspend himself at an elevated position in a tree. The saddle platform is attached about and provides a solid foothold for the suspended hunter.

It is common for saddle hunters to carry their equipment into and out of the woods, so attention to the size and weight of their equipment is important. A typical saddle platform includes a main post with a hinged platform at the bottom that engages and projects out from the tree, and a standoff at the top having a V-shaped jaw for gripping and further stapling the assembly and supporting the post offset from the tree. The assembly must be stable when mounted in the tree and the standoff at the top is often welded or bolted in fixed position so that there is no movement between the standoff and the post during usage. The platform is folded down in use to a solid stop position to support the feet of the user. Folding the post flat to platform when not in use reduces bulk and makes it easier to transport, but the standoff portion of known platforms projects outwardly with the jaws exposed when in the stowed position. The projecting standoffs add to the effective thickness of stowed package size and the jaws, which are often jagged or textured, can make the platforms difficult to transport. The projecting jaws present snag points when trying to store the platform in a backpack or trying to insert or remove other equipment placed alongside the platform. The exposed jaws can cause discomfort or unintended injury to the user should he come into contact with the jaws during handling or transport.

SUMMARY

A foldable tree platform assembly includes a longitudinal post for placement along the trunk of the tree. A foot-engaging platform is supported by the post and is moveable between a forwardly projecting use position in which the platform extends transversely of the post and defines an upper surface of the platform for supporting the foot or feet of a user and a stowed position in which the platform extends along the post. A tree-engaging standoff is supported by the post and is moveable relative to the post between a use position in which the standoff projects transversely of the post for engaging the trunk of the tree to support the post offset from the tree, and a stowed position in which the standoff is folded at least partly into the plane of the post.

One advantage of the assembly is that the standoff is moveable relative to the post between a use position and a stowed position. The stowed position places the standoff at least partly folded into the plane of the post so such that not all of the standoff projects above the post when the post is folded against the platform. In a preferred embodiment, the standoff is foldable fully into the plane of the post such that the standoff does not project above the plane of the post when in the stowed position. This provides a more compact package size of the stowed assembly. It also minimizes or eliminates projecting standoff edges that might snag on other items or cause discomfort or unintended injury to the user when packaging and transporting the assembly.

According to a preferred embodiment, the standoff is retained when moved to the use position and further preferably retained moved to the stowed position. The retention is advantageously provided by a spring latch which provides a simple and effective way to releasably hold the standoff in the use and stowed conditions. In a preferred embodiment, the spring latch is used to retain the standoff in both the use and stowed positions.

THE DRAWINGS

These and other features and advantages are better understood when considered in connection with the following detailed description and drawings, in which.

DETAILED DESCRIPTION

Figure 1:
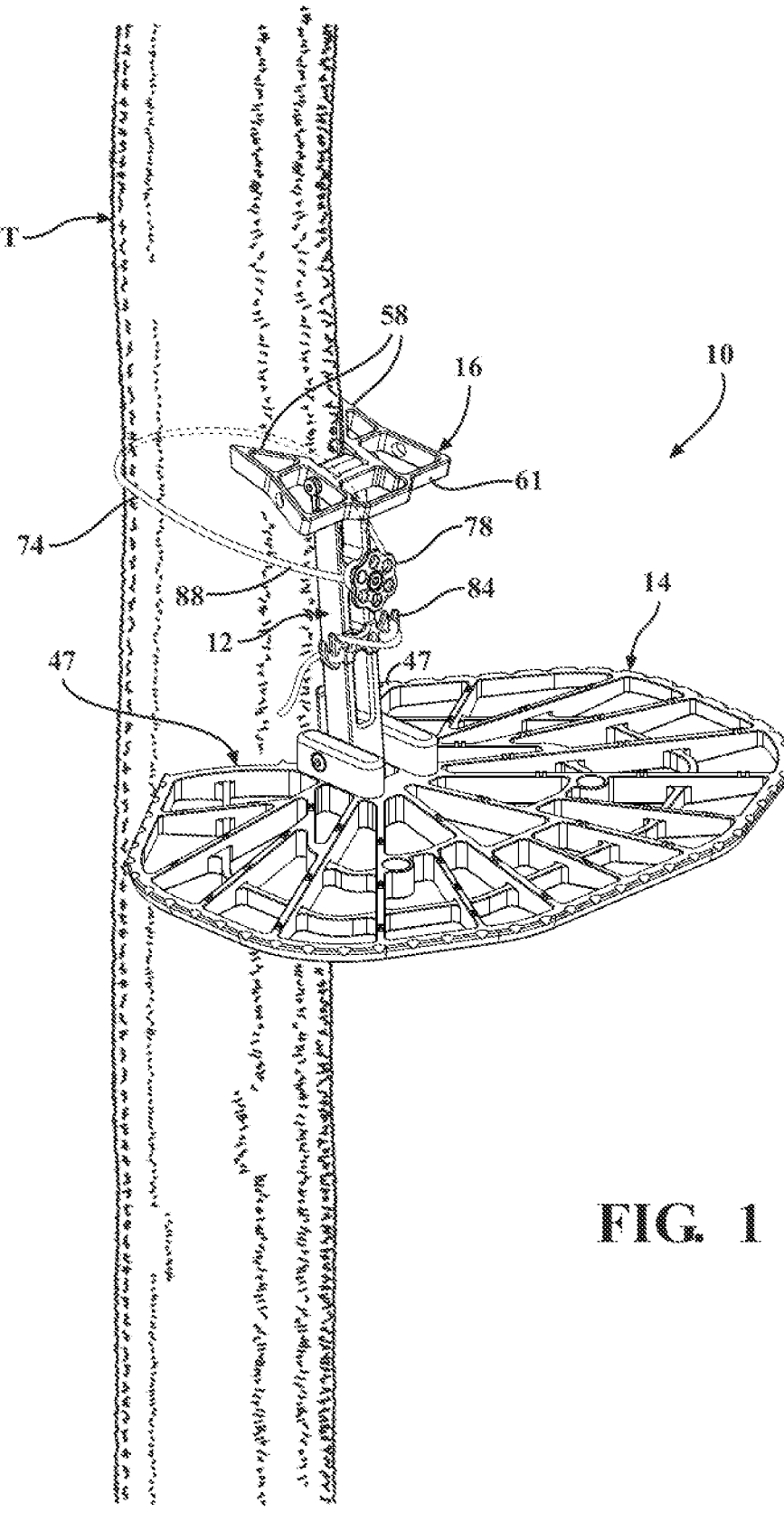
FIG. 1 is perspective view of an embodiment of a platform assembly shown mounted in a tree.

With reference initially to FIGS. 1-7, a tree platform assembly constructed according to a preferred embodiment is shown generally at 10 and is used for supporting the feet of a hunter while elevated in a tree T in the manner generally illustrated in FIG. 1.

The assembly 10 is comprised of three main components, including a riser or post 12, a platform 14 and a standoff 16. The platform 14 and standoff 16, also referred to as a top bracket, are mounted on the post 12 at spaced locations and are each selectively movable relative to the post 12 between extended "use" positions and folded "stowed" conditions. When the platform 14 and standoff 16 are in the use position, the assembly 10 is able to be mounted to the trunk of the tree T at an elevated location to provide a firm foothold to a hunter, as shown in FIG. 1, and is especially tailored for use by saddle hunters which rely on a saddle harness and suspension rigging to tether themselves from the tree T and utilize the platform assembly 10 as a stable support on which to place their feet while tethered. When the assembly 10 is not being used or when it is being transported to and from the hunting location by the user, the post 12, platform 14 and standoff 16 are collapsible to a flat folded condition for compact and convenient handling, with a package size and feel much like that of a folded laptop computer. The fully folded or stowed condition is shown generally in FIGS. 4 and 7. Further details on the construction and operation of the assembly 10 are provided below.

The post 12 is a structural member that serves as the backbone of the assembly. The post 12 extends longitudinally between opposite lower and upper ends 18, 20 and is positionable vertically along the trunk of the tree T when in use, as shown in FIG. 1. The post 12 supports the platform 14 adjacent the lower end 18 of the post 12 and supports the standoff 16 adjacent the upper end 20 of the post 12. The support for both the platform 14 and standoff 16 are preferably in the form of a respective hinge joints 19, 21, with both the platform 14 and standoff 16 being hingeable and foldable relative to the post 12 about their respective hinge joints 19, 21 for movement between the use and stowed positions.

The post 12 has back and front sides 22, 24 that define a thickness of the post 12. For purposes of description and reference only, the side of the post 12 facing the tree is designated as the back or rear face or side 22 and the side facing away from the tree is designated as the front face or side 24. When in the stowed position, the standoff 16 is folded at least partially into the plane of the post 12. In other words, rather than the standoff 16 simply folding flat against the post 12 such that their respective thicknesses stack up to the sum of each thickness of the post 12 and standoff 16, at least a portion of the standoff 16 when stowed is recessed below the back side 22 of the post 12. More preferably, the standoff 16 is folded fully into the plane of the post 12 when stowed such that the stowed standoff 16 does not project beyond the back side 22 of the post 12.

Figure 7:
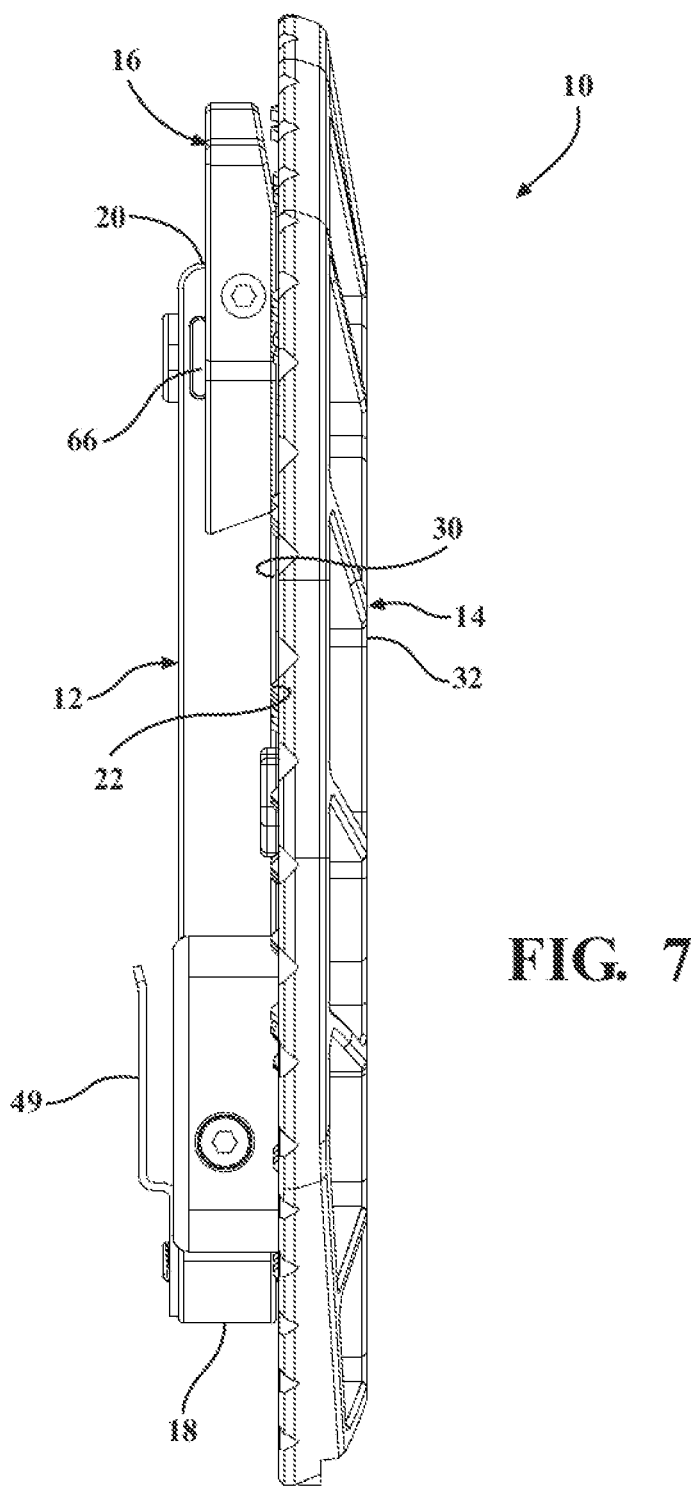
FIG. 7 is a side elevation view of the assembly in the fully folded condition.
Figure 8:
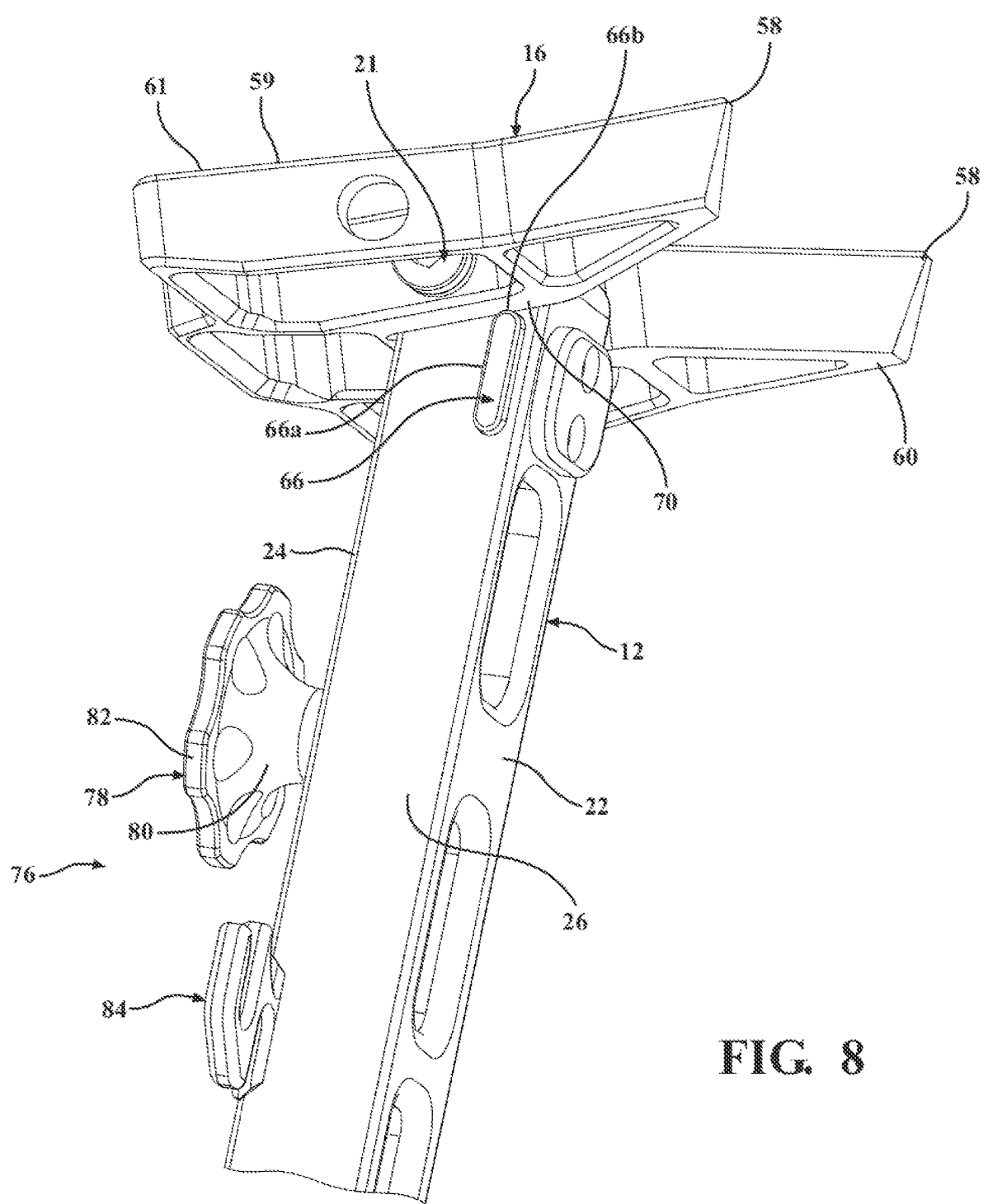
FIG. 8 is a fragmentary perspective view of the assembly with the top bracket in a deployed condition.
Figure 9:
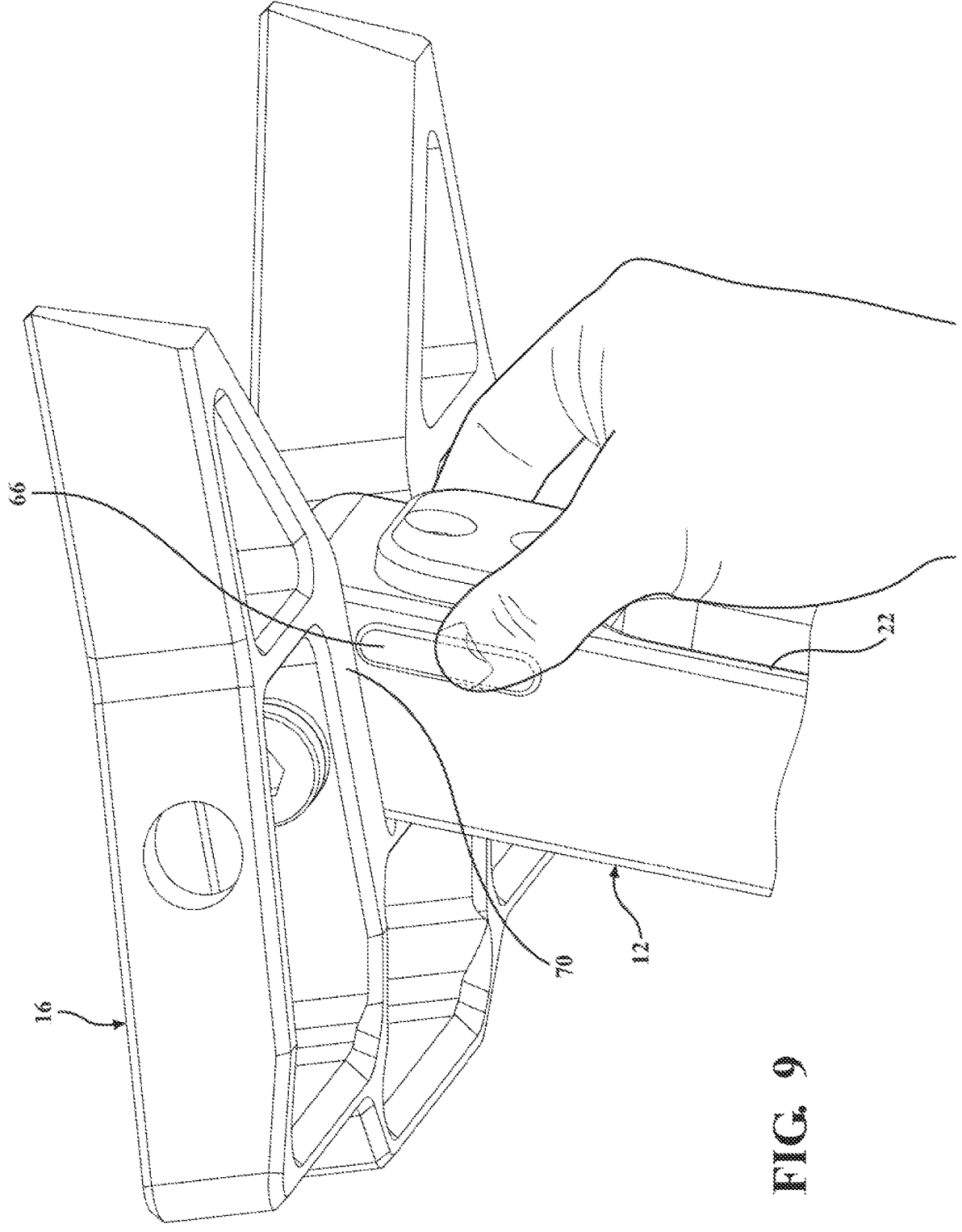
FIG. 9 is a view like FIG. 8 illustrating operation of the lock bar.

The platform 14 is foldable flat against the front side 24 of the post 12, including when the standoff 16 is in the stowed condition. When in the fully collapsed, folded, stowed condition, the standoff 16 is folded partially or fully into the plane of the post 12 and the post 12 and standoff 16 in turn are folded against the platform 14, with the resultant thickness of the stowed assembly 10 being less that the combined individual thicknesses of the standoff, 16 post 12 and platform 14 members, and more preferably being equal to the combined thicknesses of the post 12 and platform 14 members, such that the standoff 16 does not contribute to or increase the thickness of the assembly 10 when the assembly is fully folded to the stowed condition, as illustrated in FIGS. 4 and 7.

Further details of the preferred embodiment of the assembly 10, including the post 12, platform 14 and standoff 16 are described below.

Figure 2:
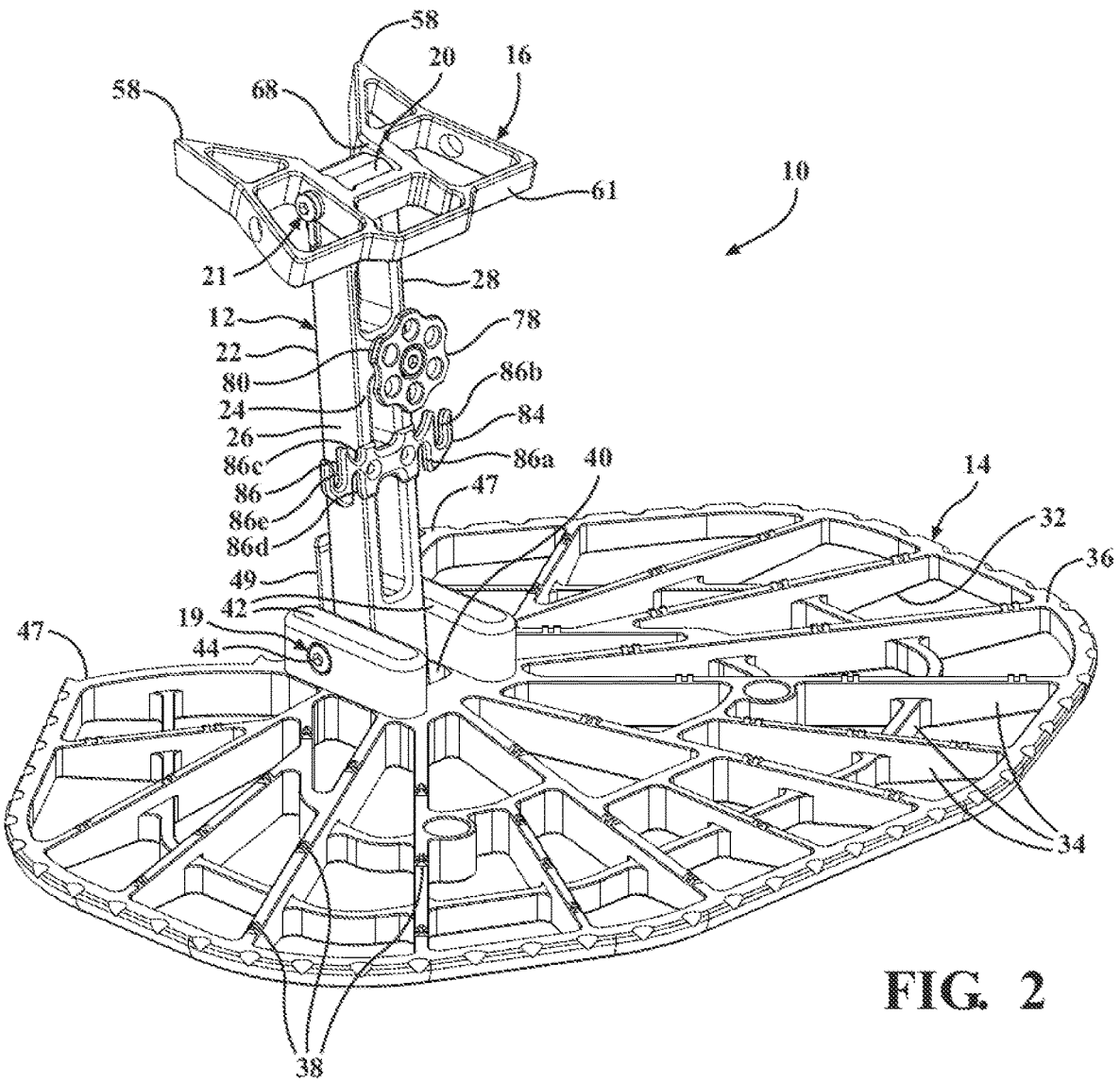
FIG. 2 is a perspective view of the assembly in a deployed condition.
Figure 3:
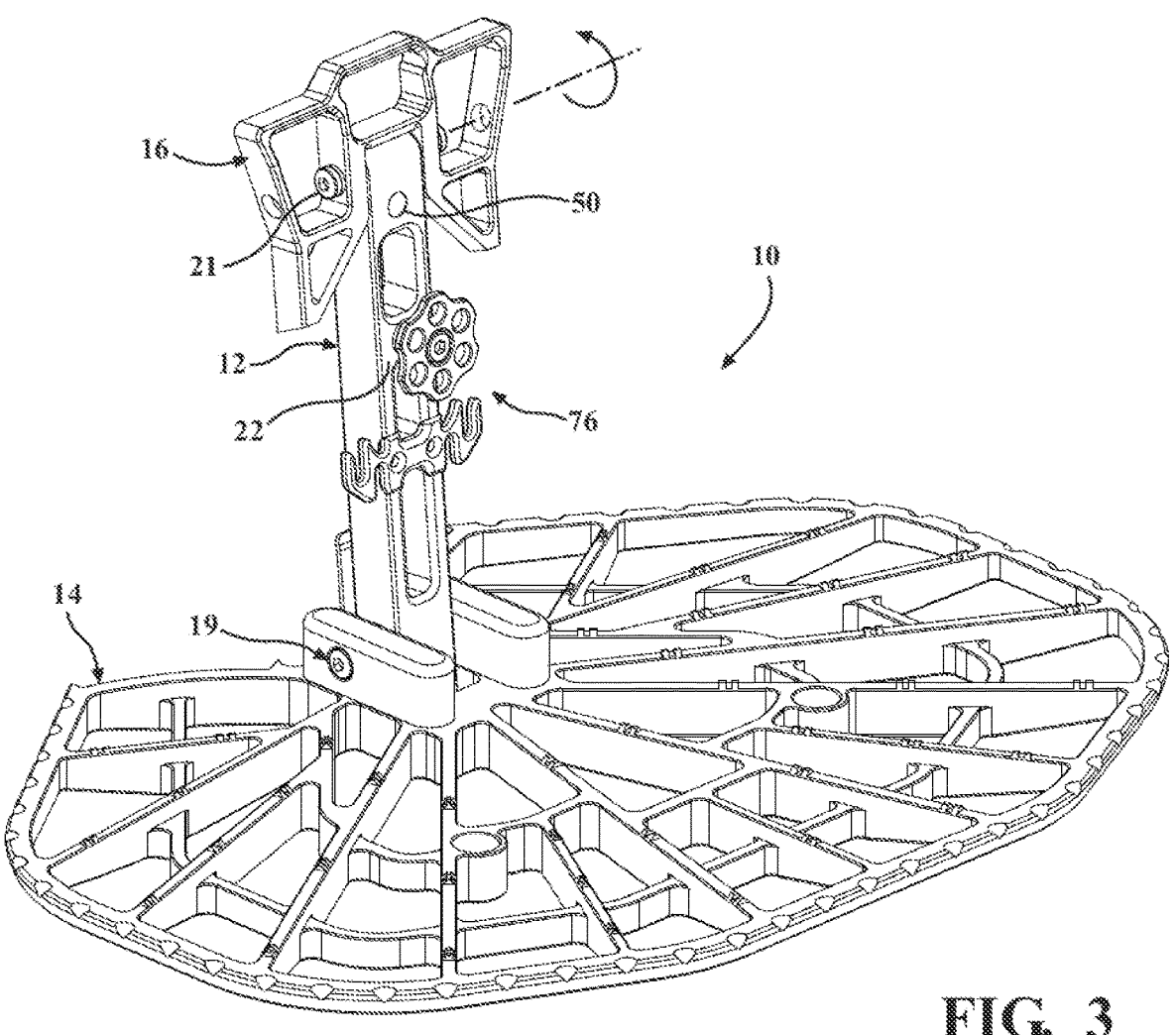
FIG. 3 is a perspective view of the assembly in a partially folded condition.
Figure 4:
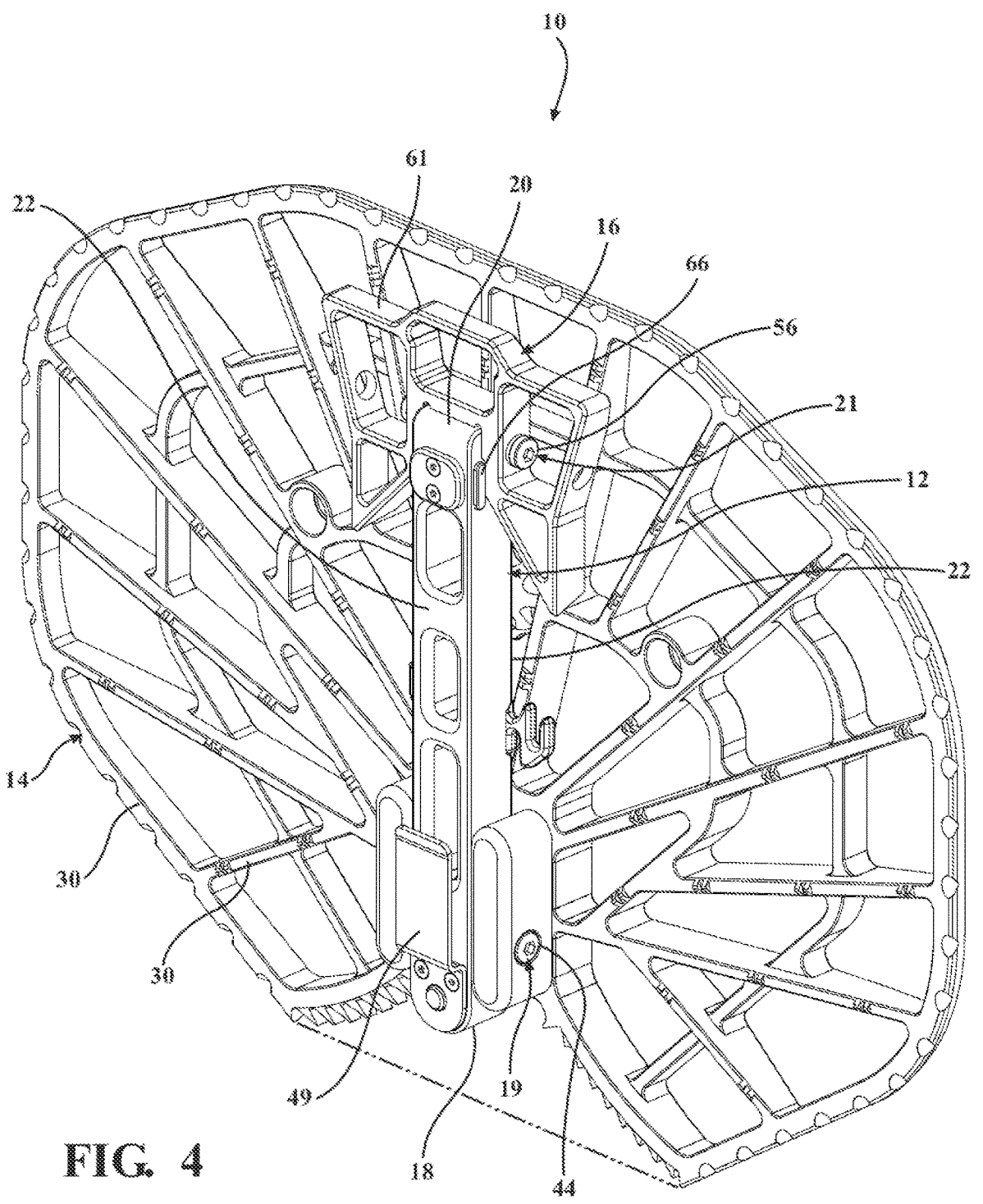
FIG. 4 is a perspective view of the assembly in a fully folded condition.
Figure 5:
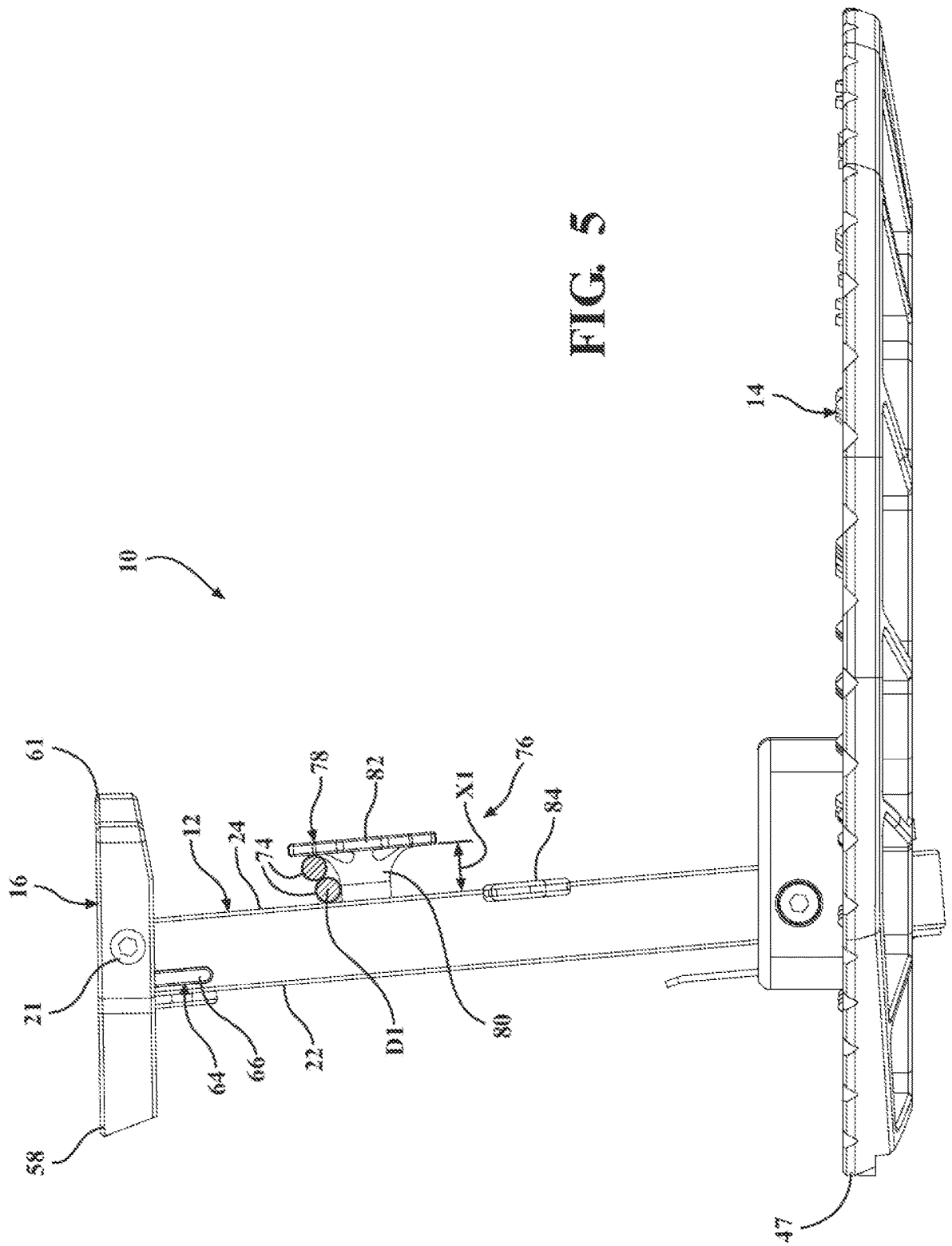
FIG. 5 is a side elevation view of the assembly in the deployed condition.
Figure 6:
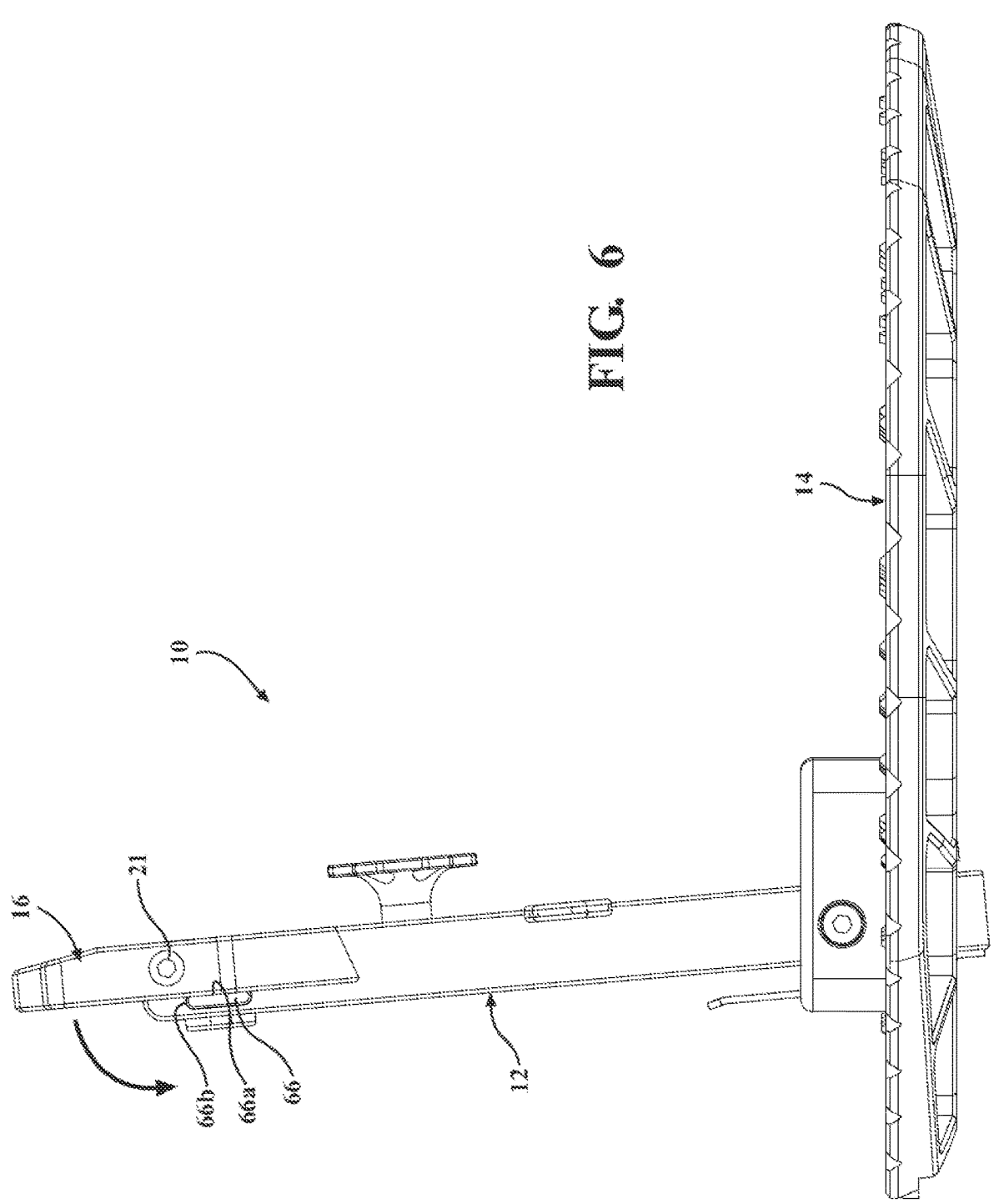
FIG. 6 is a side elevation view of the assembly in the partially folded condition.

FIGS. 2-4 show various conditions of the assembly 10 is perspective. FIG. 2 illustrates the assembly 10 in the unfolded "use" condition with the standoff 16 and platform 14 being hinged away from the post 12 and supported by the post 12 in their full deployed positions and ready for mounting in the tree in the manner illustrated in FIG. 1. FIG. 3 shows the state in which the standoff 16 has been folded from its use position to its stowed position relative to the post 12. FIG. 4 shows the assembly 10 in the fully folded or stowed condition, in which the platform 14 in FIG. 3 is now folded fully against the post 12. FIGS. 5-7 correspond with FIGS. 2-4, except showing the assembly 10 in side elevation view, and particularly with respect to FIGS. 4 and 7 which detail how the standoff 16 is recessed at least partially and preferably fully into the plane of the post 12 to yield a more compact, reduced thickness form of the assembly when fully stowed.

The post 12 preferably has a rectangular or square cross section and is preferably fabricated of metal. The post 12 is preferably of solid construction and may be made of a strong, light-weight material such as aluminum, magnesium or titanium and may be precision machined such as by CNC machining to include cut-outs to reduce weight. The opposing back and front sides 22, 24 are preferably parallel and define the thickness of the post 12. Opposite lateral side faces 26, 28 of the post 12 are also preferably parallel and define a width of the post 12. The length of the post 12 is preferably no greater than the front-to-back depth of the platform 14, such that the post 12 can be folded against the platform 14 and be contained within the footprint or area of the platform 14. In other words, if one were to place the platform 14 on edge on a flat surface, such as a table top, the post 12 would not project beyond the contacting points of the platform 14. As will be explained further below, the same applies to the standoff 16 when fully folded, wherein it too is contained within the area or footprint of the platform 14 when stowed.

The platform 14 has a main body with a top surface 30 and an opposite bottom surface 32. The platform preferably has a skeletal, open web construction defined by a plurality of intersecting ribs 34 bounded about the perimeter of the platform 14 by a rim 36 which outlines the area of the platform 14. The platform 14 may be fabricated of the same or different material as the post and may further be precision machined such as by CNC machining to form the shape and contours of the platform including the cut-outs. The top surface 30 is preferably planar and is preferably provided with grip-enhancing features 38 that serve to improve the traction and foothold of the user. The grip-enhancing features 38 include the edges of the ribs, serrations provided along the rim and aggressive protrusions projecting from the top surface 30. The protrusions may be integrally formed as part of the platform body or may comprise a plurality of set screws or studs threaded into blind bores in the ribs with protruding portions of the screws or studs extending above the plane of the top surface 30 to provide a plurality of laterally spaced, aggressive gripping or traction points for engaging the sole of hunting boots and the like to provide sure-footing to the user and minimizing foot slippage in the plane of the platform 14.

A rectangular notch or recess 40 is provided along a back edge of the platform 14 for receiving the front face 24 and the opposite lateral side faces 26, 28 of the post 12 with sufficient clearance to enable the post 12 to pivot within the notch 40. A pair of raised hinge blocks or bosses 42 project up from the top surface 30 of the platform 14 on laterally opposite sides of the notch 40 and are preferably about the same width as the notch 40. The bosses 42 may be formed as one piece with the platform 14 or may be separately formed and secured to the platform 14 such as by bolts, screws, welding or other means. The height of the bosses 42 is preferably equal to or slightly greater than the thickness of the post 12. The lower hinge joint 19 includes a hinge pin 44 that extends through aligned openings in the bosses 42 and post 12 to enable pivoting movement of the platform 14 relative to the post 12. The hinge joint 19 is preferably designed with a small amount of friction which provides some degree of resistance to hinged movement of the platform 14 relative to the post 12 to reduce rattling and to provide a solid feel to the joint 19 when the user moves the platform 14. The frictional resistance is sufficient to prevent the post 12 from rotating under its own weight at the joint 19. The friction may be provided by slight compression at the joint 19 and may include one or more friction washers, such as nylon washers.

Figure 12:
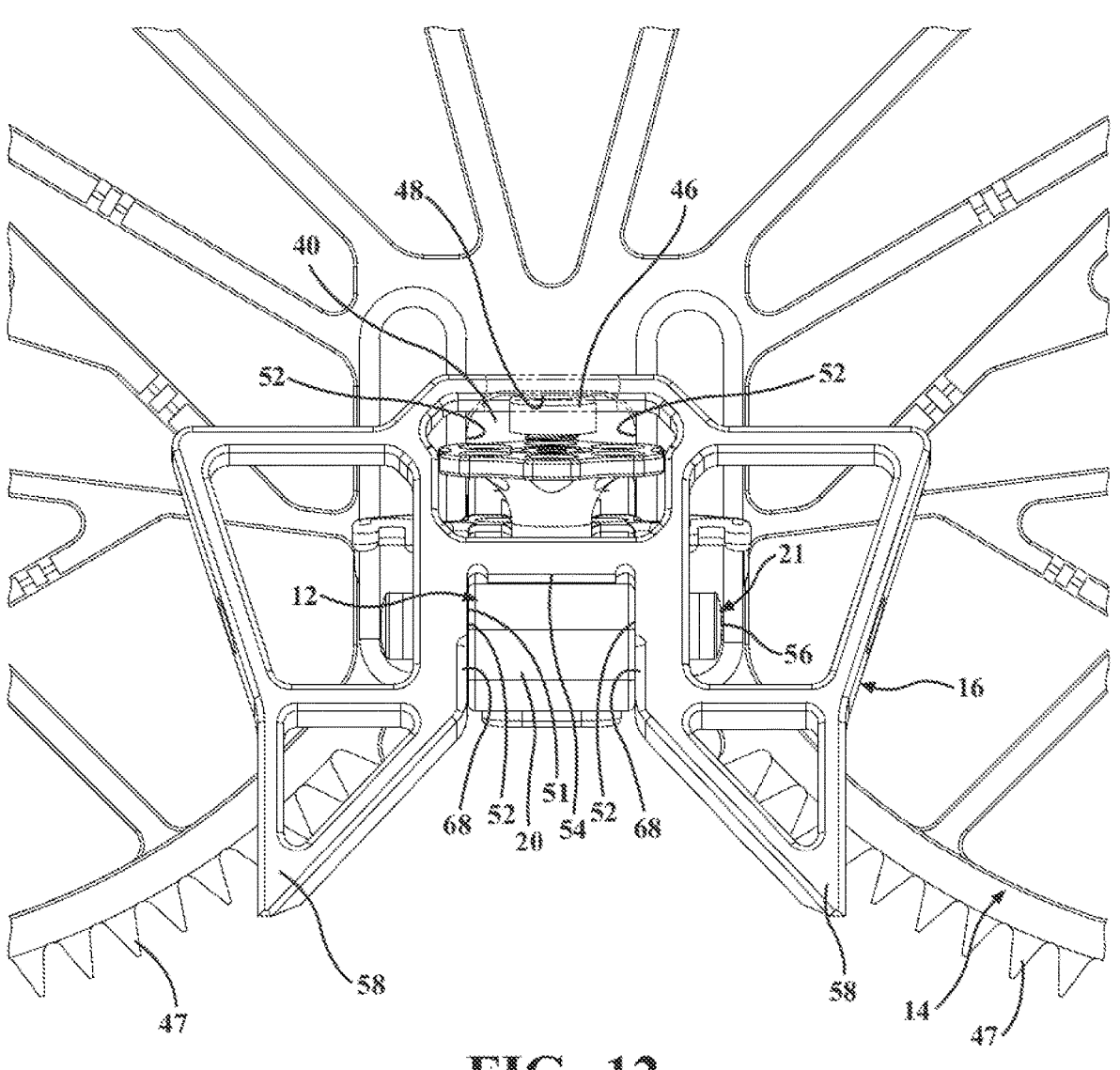
FIG. 12 is a fragmentary top view in the deployed condition.
Figure 13:
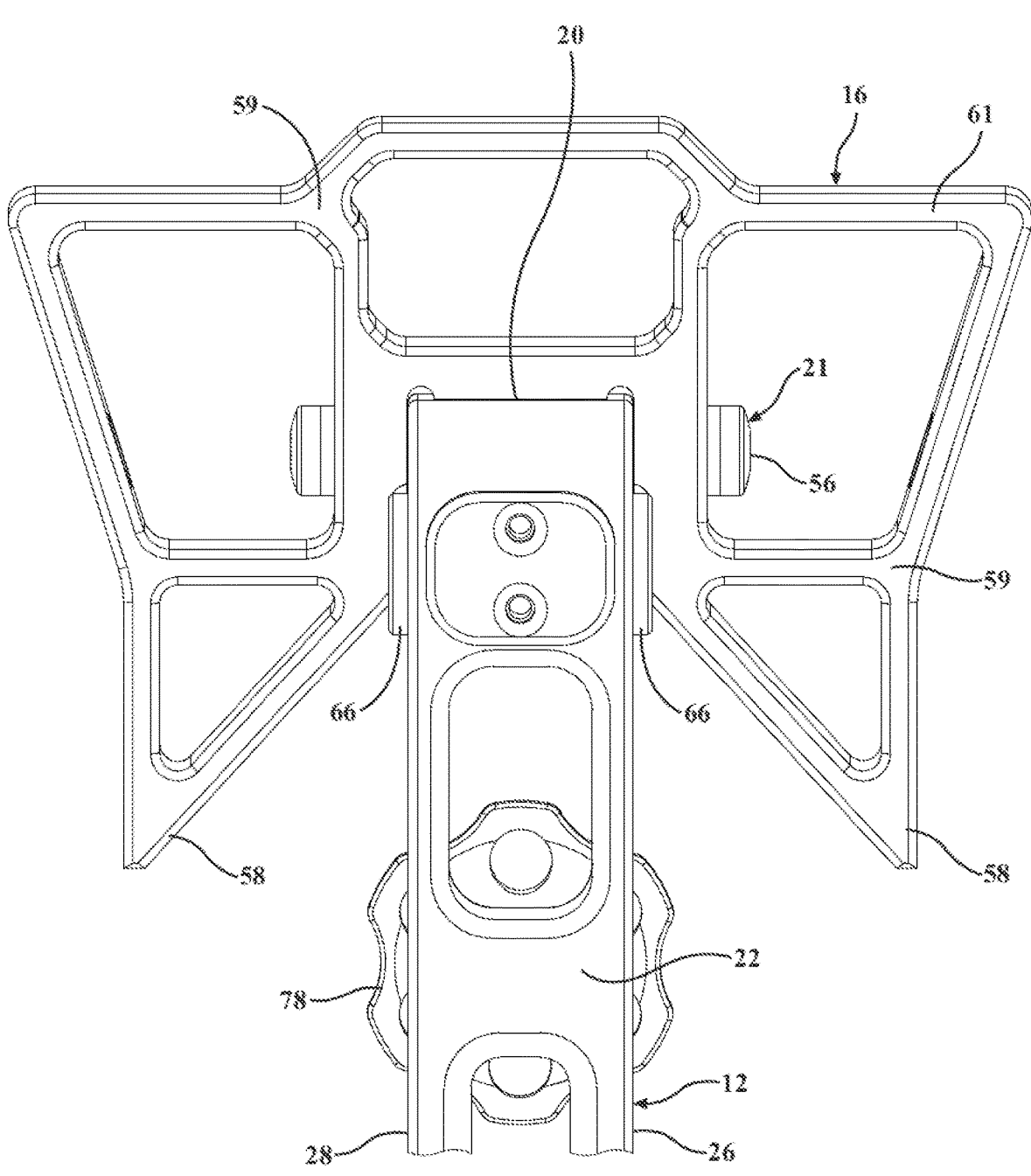
FIG. 13 is a fragmentary elevation view showing the top bracket in the stowed condition.

A capped adjustment screw 46 is threaded into the front face 22 of the post 12 at a location below the hinge pin 44 (i.e., between the hinge pin 44 and the lower end 18), as best seen from the fragmentary top view of FIG. 12. The cap screw 46 has a head that confronts an end wall 48 of the notch 40 to serve as a hard stop to limit the hinged travel of the platform 14 relative to the post 12 in the use position. Loosening or tightening the adjustment screw 46 increases or decreases, respectively, the extension of the head and increases or decreases, respectively, the angle formed between the top surface of the platform 14 and the front face 22 of the post 12 in the fully deployed use position, illustrated in FIGS. 1, 2, 3, 5 and 6. The included angle preferably ranges from less than 90 degrees to more than 90 degrees relative to the axis of the post 12, and even more preferably between 70 and 210 degrees relative to the axis of the post 12, allowing the user to adjust the angle of the platform 14 for personal preference and comfort. The head of the adjustment screw 46 may be knurled enhance gripping by a user when turning the screw by hand.

The location of the hinge pin 44 enables the front face 22 of the post 12 to be folded flat against the top surface 30 of the platform 14 when in the stowed position, as illustrated in FIGS. 4 and 7. An elastic spacer or bumper 50, as illustrated in FIG. 3, may project from the front face 22 of the post 12 (or from the opposing surface of the platform 14) to provide cushioned contact and prevent metal-to-metal contact between the confronting surfaces of the post 12 and platform 14 when fully folded (as in FIG. 4) in order to prevent rattling and to provide a solid feel to the assembly by the user when folding the post 12 against the platform 14. The slight friction in the hinge joint 19 provides sufficient resistance to movement to hold the post 12 in the folded, stowed position until it is to be redeployed by the user. In other words, when supporting the weight of the platform 14, the friction of the joint 19 is sufficient to prevent the post 12 from hinging away from the fully folded position against the platform 14.

Leg portions 47 project from the back of the platform 14 on either side of the notch 40 to form a V-shaped jaw which may be textured for gripping the trunk of the tree T and supporting the lower end of the post 12 offset from the tree. When fully folded, the furthest point of the leg portions 47 project beyond the lower end 18 of the post 12, such that the lower end 18 is contained within the areal footprint of the platform 14. A carrying hook 49 may project longitudinally beyond the lower end 18 of the post 12 and it too does not extend past the leg portions 47 and thus is also contained within the footprint of the platform 14. This is shown in FIG. 4 where it can be seen that the lower end 18 of post 12 and carrying hook 49 do not extend beyond a broken chain line extending between the peaks of the leg portions 47, such that when in the folded condition, the legs portions 47 represent the further projecting feature of the assembly 10 in the lower hinge 44 region. FIG. 4 also shows the top 20 of the post and standoff 16 fully contained within the footprint of the platform 14.

With additional reference to FIGS. 8-14, the standoff 16 includes a U-shaped cutout or recess 51 defining opposing inner side walls 52 and a base wall 54 extending between and interconnecting the side walls 52. The upper end portion 20 of the post 12 is received in the recess 51. A hinge pin 56 extends through aligned openings in the side walls 52 and post 12 to serve as the hinge joint 21 of the standoff 16. The joint 21 includes frictional resistant to movement to provide a solid feel to the user and so that the joint feels neither loose or sloppy nor overly tight. The friction may be provided by nylon washers or the like.

The standoff 16 includes laterally spaced leg portions 58 that extend from the main body 48, and preferably as an extension of the side walls 52, and diverge outwardly from the side faces 26, 28 of the post 12 to form a V-shaped jaw for cradling the tree. The standoff 16 may be made of the same material as the post 12 and platform 14 and may be similarly precision machined such as by CNC machining to include cut-out portions or windows to minimize weight.

When the standoff 16 is in the stowed position, shown in FIGS. 3, 4, 6, 7, 11 and 13, the standoff 16 is arranged generally parallel to the post 12. More specifically, the upper end 20 of the post 12 may confront or be spaced from the base wall 54 of the recess 51. The side walls 52 extend longitudinally along the opposite side faces 26, 28 of the post 12 toward the platform 14. The engagement between the upper end 20 and base wall 54 represents a hard stop and limits the hinging movement of the standoff 16 relative to the post 12 when fully rotated in the stowed position. The standoff 16 has a top surface 59 and an opposite bottom surface 60. When in the stowed position, the top surface 59 faces away from the front face 24 of the post 12.

To move the standoff 16 from the stowed position of FIGS. 3, 6, 11 and 13 to the use position of FIGS. 2, 5, 8 and 12, the standoff 16 is bodily rotated about the hinge pin 56 relative to the post 12 (clockwise in FIG. 3) to move the leg portions 58 transversely outwardly of the rear face 22 of the post 12 to position the V-shaped jaw of the standoff 16 transversely of the post 12. When rotated, the base wall 54 of the recess 50 rotates around the end 18 of the post 12 and confronts the front face 24 of the post 12 to limit rotational movement of the standoff 16 in the use position. When in the use position, a main body 61 of the standoff 16 projects forwardly of the front face 24 of the post 12 opposite the leg portions 58, which project rearwardly away from the rear face 22 of the post 12.

The assembly includes a retention device 64 that operates to releasably hold the standoff 16 in the use position. The preferred form of the retention device 64 is a spring latch mechanism which has shoulders that selectively protrude into the path of the standoff 16 to selectively impair or block movement of the standoff 16 when positioned in the use and stowed positions. In the illustrated embodiment, the retention device 64 includes at least one and preferably a pair of spring buttons or lock bars 66 that project from the opposite side faces 26, 28 of the post 12 at a location spaced below and rearward of the hinge pin 56. The buttons 66 are self-biased by resilient internal springs to an outward projecting, locking position.

Figure 10:
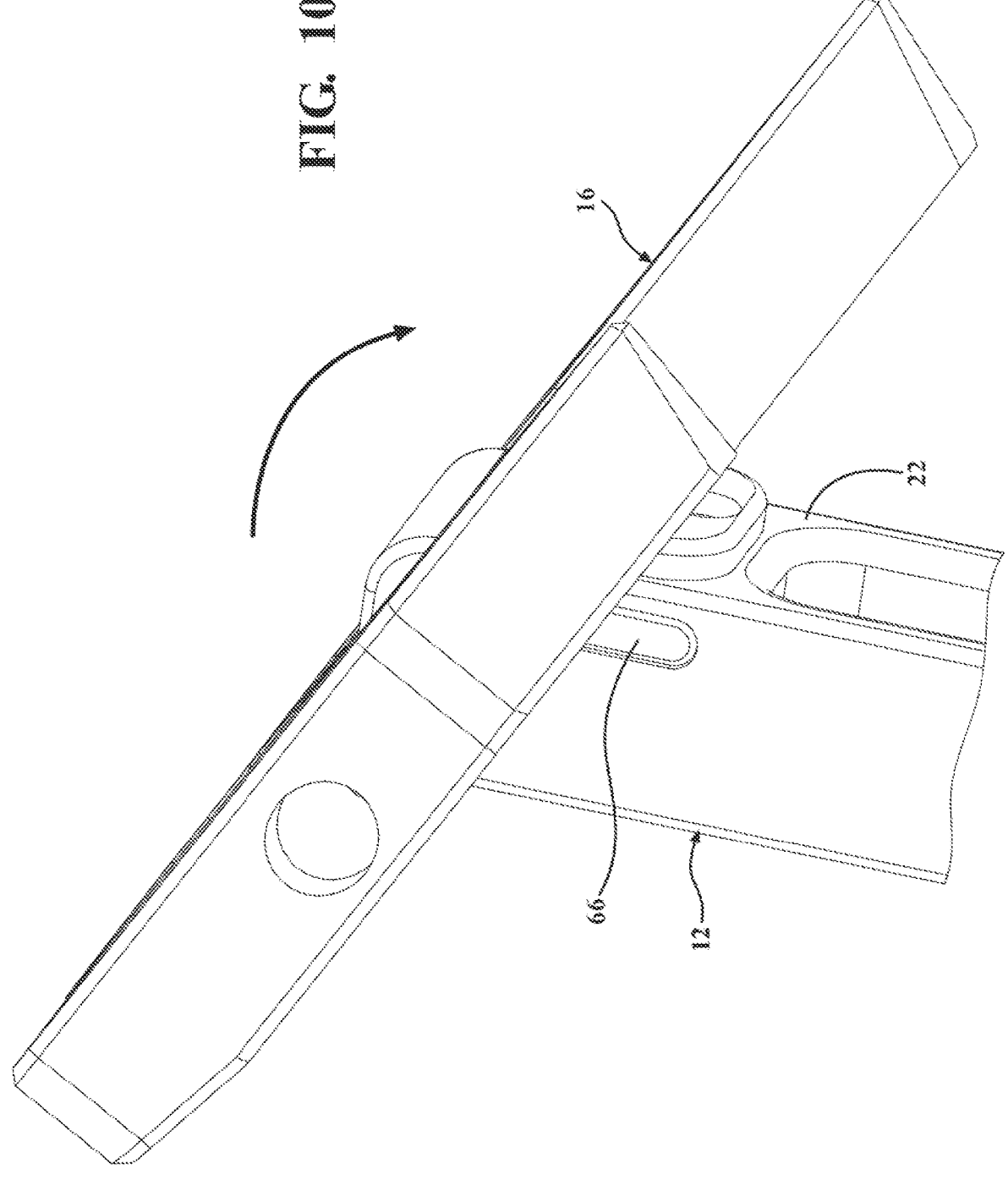
FIG. 10 is a view like FIG. 9 showing the top bracket in a partially folded condition.
Figure 14:
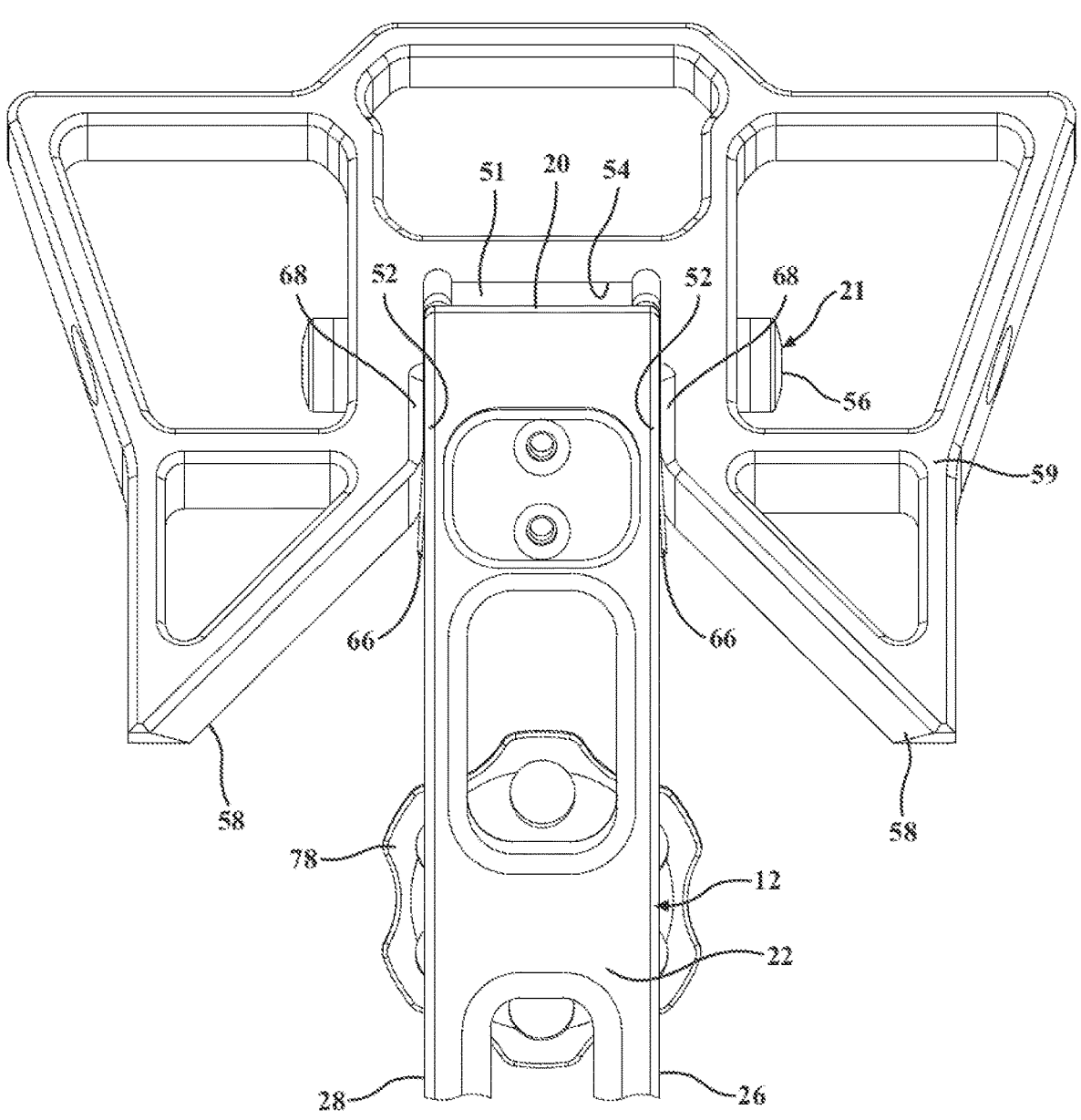
FIG. 14 is a view like FIG. 13 but showing the top bracket partially rotated toward the stowed condition.

With the standoff 16 initially starting in the stowed position, as illustrated in FIGS. 3, 4, 6, 7, 11 and 13, the structure of the standoff 16, including side walls 52, is clear of the buttons 66, allowing the buttons 66 to self-project or self-bias outward under the force of their springs beyond the top face 59 of the standoff 16. The buttons 66 now lie in the path of rotational movement of the standoff 16 toward to use position, thus resisting free rotation of the standoff 16 out of the stowed position without manipulation of the retention device 64. The user may either manually depress the buttons 66 to clear them of the standoff 16, or the user may apply a slightly increased rotational force to the standoff 16 to force the standoff 16 past the buttons 16. For this latter purpose, the standoff is advantageously provided with shaped edges 68 that act to depress the buttons 66 inward in response to forced rotation toward the use position. With particular reference to the embodiment shown in FIGS. 11-14, it will be seen that the shaped edges 68 comprise chamfered or ramped surfaces 68 extending between the top surface 59 and the inner side walls 52 of the standoff 16 bordering the recess 51 and lying in the path of the buttons 66 when the standoff 16 is rotated toward the use position. When the user bodily rotates the standoff 16 about the hinge pin 56 from the stowed position toward the use position (e.g., clockwise in illustration of FIG. 3), the chamfered edges 68 confront forward respective edges 66a of the buttons 66 and offer initial resistance to free rotation. Exertion of a slight increased force causes the chamfered edges 68 to ride up and over the buttons 66, depressing them inward and permitting the inner side walls 52 to move past the buttons 66. FIGS. 10 and 14 illustrate an intermediate position of the standoff 16, wherein the buttons 66 are depressed inward by action of the standoff 16 being pivoted to an intermediate position over top of the buttons 16 between the use and stowed positions.

When the standoff 16 is rotated far enough toward the use position to where the inner side walls 52 clear the buttons 66, the buttons 66 spring back and self-return outward and lock behind the opposite bottom surface 60 of the standoff 15 adjacent the cutout 50. This can best be seen in FIGS. 2, 5 and 8. Locking edges 70 between the bottom surface 60) and inner side walls 52 associated upper faces 66b of the buttons 66 when in the use position and secure the standoff 16 securely but releasably in place. The locking edges 70 of the bottom surface 60 are comparatively unchamfered and abrupt or sharp relative to the chamfered edges 68 of the top surface 59. The top faces 72 are also abrupt. The confronting surfaces of 70) and 72 do not cam over one another under application of a rotational load but block such movement. While application of a slight rotational force by the user is effective to move the standoff 16 from the stowed to the use position due to the chamfered edges 68, application of the same force on the opposite direction is insufficient to move the standoff 66 from the use to the stowed position, as the abrupt locking edges 70 of the standoff engage the abrupt upper faces 72 of the buttons 66 to securely but releasably lock the standoff 16 in the use position.

Figure 11:
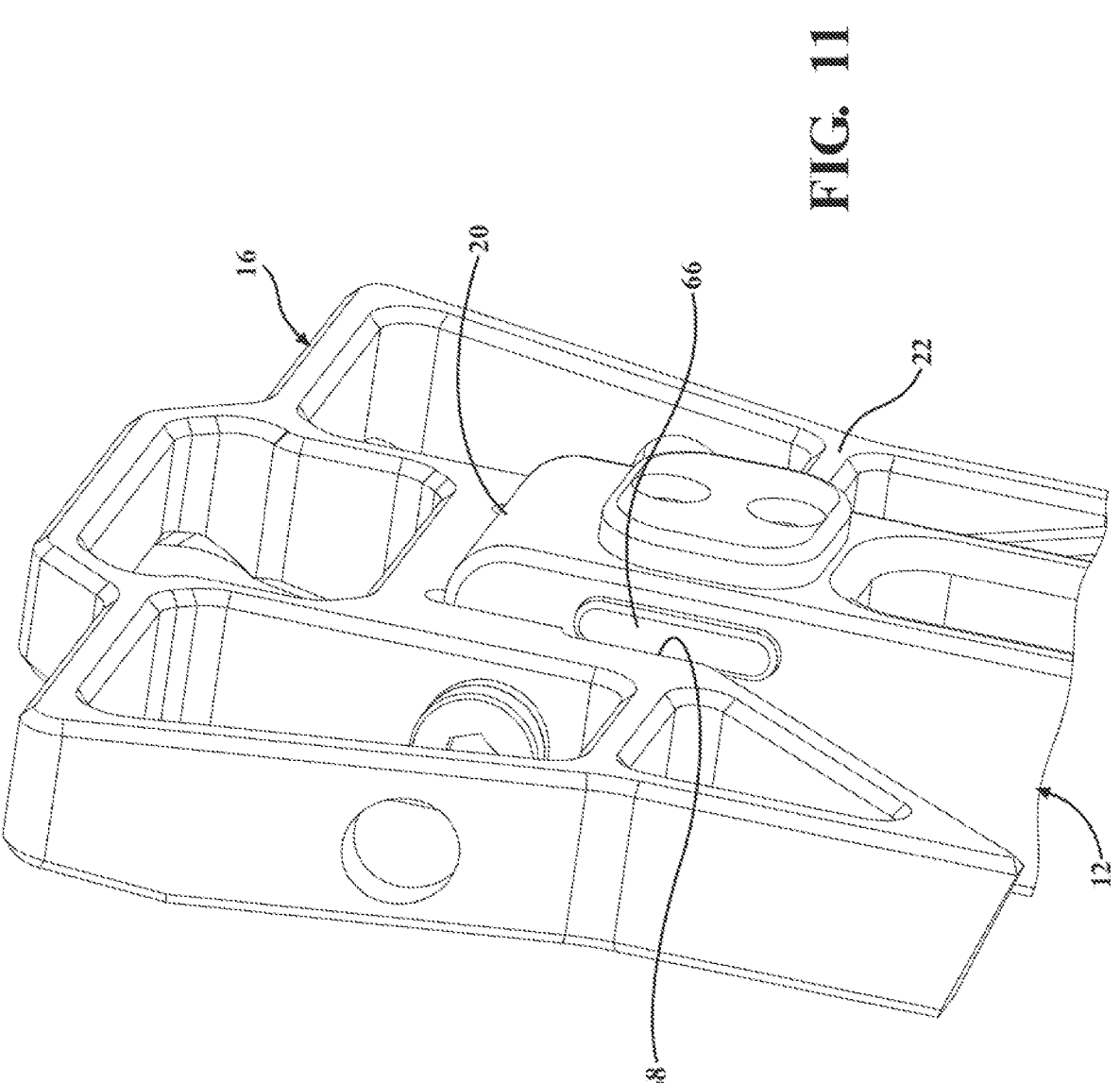
FIG. 11 is a view like FIG. 10 showing the top bracket in the fully folded condition.

When the user is ready to release the standoff 16 from the use position, this can be achieved by bodily depressing the buttons 66 inwardly (FIG. 9) while rotating the standoff 16 (clockwise in FIG. 10) to enable the inner side walls 52 to glide over top of the depressed buttons 66. The rotation tilts the leg portions 58 downwardly toward the platform 14 and tilts the main body 61 upwardly beyond the upper end 20 of the post 12. The outward spring return force of the buttons 66 coupled with the frictional resistance of the hinge joint gives the user a firm, solid feel when rotating the standoff 16 toward the stowed position. Once in the stowed position, the side walls 52 clear the buttons 66 which spring back out and lock behind the top surface 50 of the standoff 16 (FIG. 11). The standoff 16 lies in the plane of the post 12 with the top

59 and bottom 60 surfaces parallel to the rear 22 and front 24 faces of the post and with the main body 61 of the standoff 16 projecting upwardly off the upper end 20 of the post 12.

In use, it will be appreciated that when a hunter is preparing for a hunt, the standoff 16 and platform 14 of the assembly 10 can be quickly folded flat to their stowed positions by rotating the standoff 16 into the plane of the post 12 and then rotating the stowed standoff 16 and post 12 flat against the platform 14. FIGS. 4 and 7 illustrate the fully folded condition of the assembly 10. This is done without need for special tools and without any removal of fasteners or having to contend with any loose parts. The folded assembly 10 can be easily slid into a backpack or bag with minimal chance of the assembly becoming snagged and without any bulky or protruding edges, including those of the leg portions 58 of the standoff 16 which are folded flat into the plane of the post 12.

Once the hunter arrives at the desired hunting location, the assembly 10 can be slid out of the backpack and the post 12 rotated upwardly transversely of the platform 14 and the standoff 16 rotated and locked in the use position. The leg portions 58 of the standoff 16 are positioned against the trunk of the tree T at the desired elevated height and a strap or rope 74 is then secured to the assembly, lashed about the tree T and then the free end secured to the assembly to hold the assembly firmly and safely in position for use by the hunter, as illustrated n FIG. 1. The platform 14 is rotated from the stowed to the use position either before or after the platform 10 is secured to the tree, with its legs 47 firmly engaging the trunk of the tree T.

The assembly 10 may include a designated rope anchor 76 for securing the rope 74. The rope anchor 76 may include a tab 78 which may project from the front face 22 of the post 12 in position to be received in an aligned opening or cut-out of the platform 18 when in the stowed position so as not to add to the folded stackup thickness of the post 12 and platform when stowed. The tab 78 is preferably positioned closer to the standoff 16 than to the platform 14. The tab 78 includes a shank portion 80 and an enlarged head portion 82. The shank portion 80 is preferably smooth and rounded so as not to abrade the rope 74 when slip across or about the shank portion 80. In cross-section, the shank is preferably circular and has not sharp edges or abrupt features that would impede smooth sliding of a rope 74 about the shank portion 80. The shank portion 80 resides between the front face 24 of the post 12 to the inside and the head portion 82 to the outside to provide a bearing surface which can accommodate wrapping and tightening of the rope 74 without sliding off either end of the shank portion 80. The spacing X1 between the head portion 82 and the front face 24 is greater than the diameter D1 of the rope 74 such that the rope is not compressed or wedged between the head portion 82 and the front face 24 but can freely slide. This is illustrated in FIG. 5, where it can be seen that the spacing X1 is wide enough to accommodate at least two winds (D1×2) of the rope 74 without causing binding between the head 82 and front face 24 of the post.

The tab 78 may be optionally be used alone, wherein one end of the rope 74 is attached to the tab 78 and the free end looped about the tree trunk T and then wrapped about the shank portion 80 and tension force then applied to the rope 74 to forcibly draw the V-shaped cradle of leg portions 58 of the standoff 16 tight against the tree T to minimize any relative movement of the platform assembly 10. Once tightened, the free end of the rope 74 may be tied off to structure of the platform assembly 10 to secure the rope 74 against loosening. The platform 14 may be rotated to its use position before or after securing the rope 74. Rotating the platform 14 to its use position after the rope 74 is secured further adds to the tightness of the rope 74, as pivoting the platform 14 rotates the leg portions 47 into engagement with the tree T and forces the lower end portion of the post 12 outward of the tree T.

According to a further preferred feature, the rope anchor 76 may further include a rope cinch or cleat 84 used in cooperation with the shank portion 80 for securing the free end portion of the rope 74 extending from the shank portion 80 after tightening. The cleat 84 preferably has a plurality of spaced slots 86 at least some of which are preferably smaller in width than the diameter D1 of the rope 74 such that when the rope 74 is slid into the slots 86 the rope 74 is caused to be radially pinched or compressed to create frictional resistance to sliding of the rope 74. FIGS. 1-3 illustrate a preferred embodiment of the cleat 84, which in this embodiment is formed as a separate structure from the tab 78 and spaced laterally from the tab 78 and more preferably below the tab 78 with not interfering structure or components there between. The cleat 84 has portions that project from the opposite sides 26, 28 of the post 12 and each side includes a plurality of the slots 86, some which are open to the top and others which are open to the bottom.

FIG. 1 illustrates a preferred way of using the tab 78 and cleat 84 in cooperation to quickly and securely mount the platform 10 to the tree. The rope 74 preferably has a starter loop 88 provided at one end. The loop 88 is guided over the head portion 82 of the tab and onto the shank portion 80. The free end of the rope 74 is wrapped around the back of the tree T and then guided beneath the tab 78 and the rope at the 9:00 position. The free end of the rope 74 is then wrapped clockwise toward the 6:00 position while the hunter pulls the rope 74 tight, using the smooth shank surface 80 as a fulcrum to draw the leg portions 58 of the standoff tight against the tree T. The 270° wrap of the rope 74 about the shank portion 80 provides sufficient leverage where the hunter can simultaneously guide the free end of the rope 74 into the slots of the cleat 84 to secure the rope 74 against loosening.

The location of the cleat 84 immediately below the tab 78 advantageously enables the hunter to guide the free end on the rope 74 along the back of one side of the cleat 84 while the rope is maintained under tension to keep the platform assembly 10 firmly drawn to the tree T. Once behind the cleat 84, the rope 74 is wrapped around the bottom of the cleat 84 and forced into lower slot 86a which pinches the rope 74 and secures it against slipping and loosening about the tab 78. The rope 74 is further wrapped around the front of the cleat 84 and forced into the upper slot 86b and then wrapped around and to the front of the cleat 84 and the rope 84 crossed over to the other side of the cleat 84 and guided into a top slot 86c, wrapped behind and forced into a bottom slot 86d and finally wrapped in front and forced into the other top slot 86d. The multiple slots 86 pinch the rope 74 and the wrapping of the rope 74 about the front and back of the cleat 84 secure the free end of the rope 74 and prevent the rope from loosening about the tree T, without having to tie knots or using two hands. The combination of the shank 80 and cleat 84 enables the hunter to place and secure the platform assembly 10 in the tree in a manner of seconds and with the ability to manipulate the rope 74 with one hand.

It will be appreciated that the above description describes the concept of a fold-flat tree platform assembly whose standoff lies partially and preferably fully in the plane of the post when stowed for a flat, compact, snag-free storage solution. It will further be appreciated that the above description describes an improved anchoring system for securing the platform assembly to a tree using a fulcrum to draw and tension the rope in combination with a cleat to receive and grip the free end of the rope in a manner which is simple, fast and effective to maintain the tension on the rope during use. The illustrated drawings and accompanying description are directed to one or more specific embodiment(s). Those skilled in the art will appreciate that other approaches may be taken which achieve the same objectives and results, including tree platforms of more or less refined design. In other words, the invention can be practiced in ways other than those described and the invention is limited only by the claims and not the specific embodiment(s) described above.

What is claimed is:

1. A foldable tree platform assembly, comprising:
   a single central longitudinal post for placement along the trunk of the tree, the post having a front face and a rear face that define respective front and rear planes;
   a foot-engaging platform supported by the post and moveable between a forwardly projecting use position in which the platform extends transversely of the post and defines an upper surface of the platform for supporting the foot or feet of a user and a stowed position in which the platform extends along the post; and
   a standoff that is distinct from the platform and supported by the post adjacent an upper end of the post and moveable relative to the post between a use position in which a tree-engaging portion of the standoff projects laterally away from the rear face of the post for engaging the trunk of the tree to support the post offset from the tree and a stowed position in which the standoff is folded at least partly into the plane of the post, wherein, in the stowed position, the tree-engaging portion of the standoff lies longitudinally alongside the post and is positioned at least in part within a space bounded by the front and rear planes.

2. The assembly of claim 1, wherein, in the stowed position, the standoff does not project beyond the front plane of the post.

3. The assembly of claim 2, wherein the standoff projects beyond the back face and front face of the post when in the use position.

4. The assembly of claim 2, wherein the platform includes a tree-engaging portion projecting beyond the back face of the post when in the use condition for engaging the trunk of the tree at a location longitudinally spaced from the standoff.

5. The assembly of claim 1, wherein the post and the standoff have longitudinal overlap portions when in the stowed position and each has a front-to-back thickness between their front and back faces, and wherein a front-to-back folded stackup thickness of the post and standoff when stowed, measured between the front plane and the rear plane of the post, is less than the sum of the individual thicknesses of the post and standoff.

6. The assembly of claim 5, wherein the folded stackup thickness is no greater than the thickness of the post.

7. The assembly of claim 1, wherein the standoff includes a pair of spaced legs that straddle opposite side faces of the post and including a pivot pin supporting the spaced legs.

8. The assembly of claim 7, wherein the standoff includes a V-shaped jaw extending opposite the spaced legs for engaging the tree.

9. The assembly of claim 8, wherein the V-shaped jaw includes tree-engaging surfaces which taper from a relatively wider mouth to a relatively narrower throat of the V-shaped jaw, and wherein the mounting legs include inner surfaces which extend from the throat away from the V-shaped jaw.

10. The assembly of claim 1, including a retainer interacting with the standoff when in the use position to resist folding to the stowed position.

11. The assembly of claim 10, wherein the retainer comprises a spring latch and which further interacts with the standoff when in the stowed position to resist movement to the use position.

12. The assembly of claim 11, wherein the spring latch includes moveable stops which are spring biased outwardly on opposite sides of the post and include a first surface for confronting the standoff when in the use position and a second surface for confronting the standoff when in the stowed position.

13. The assembly of claim 12, wherein the stops are rectangular.

14. The assembly of claim 10, wherein the inner surfaces of the mounting legs are connected at a base end thereof by a base wall that is spaced from the throat.

15. The assembly of claim 14, wherein the base wall confronts the post when the standoff is in the use position to prevent pivotal movement of the standoff beyond the use position.

16. The assembly of claim 15, wherein the post has an upper end which nests with the inner surfaces and base wall of the upper stand-off when in the stowed position.

17. The assembly of claim 14, wherein a pivot pin connects the mounting legs to the post and is disposed between the base wall and the throat.

18. The assembly of claim 1, wherein the platform has an outer perimeter bounding an area, and wherein the standoff is contained within the area of the platform when in the stowed position and positioned at least in part within a space bounded by the front and rear planes of the post.

19. The assembly of claim 1 wherein the platform is hinged to the post.

20. The assembly of claim 1, including a knob for guiding and supporting a rope or strap to be wrapped about the tree to secure the assembly to the tree, and further including a cinch for gripping and securing the rope or strap in a tightened condition.

* * * * *